United States Patent Office.

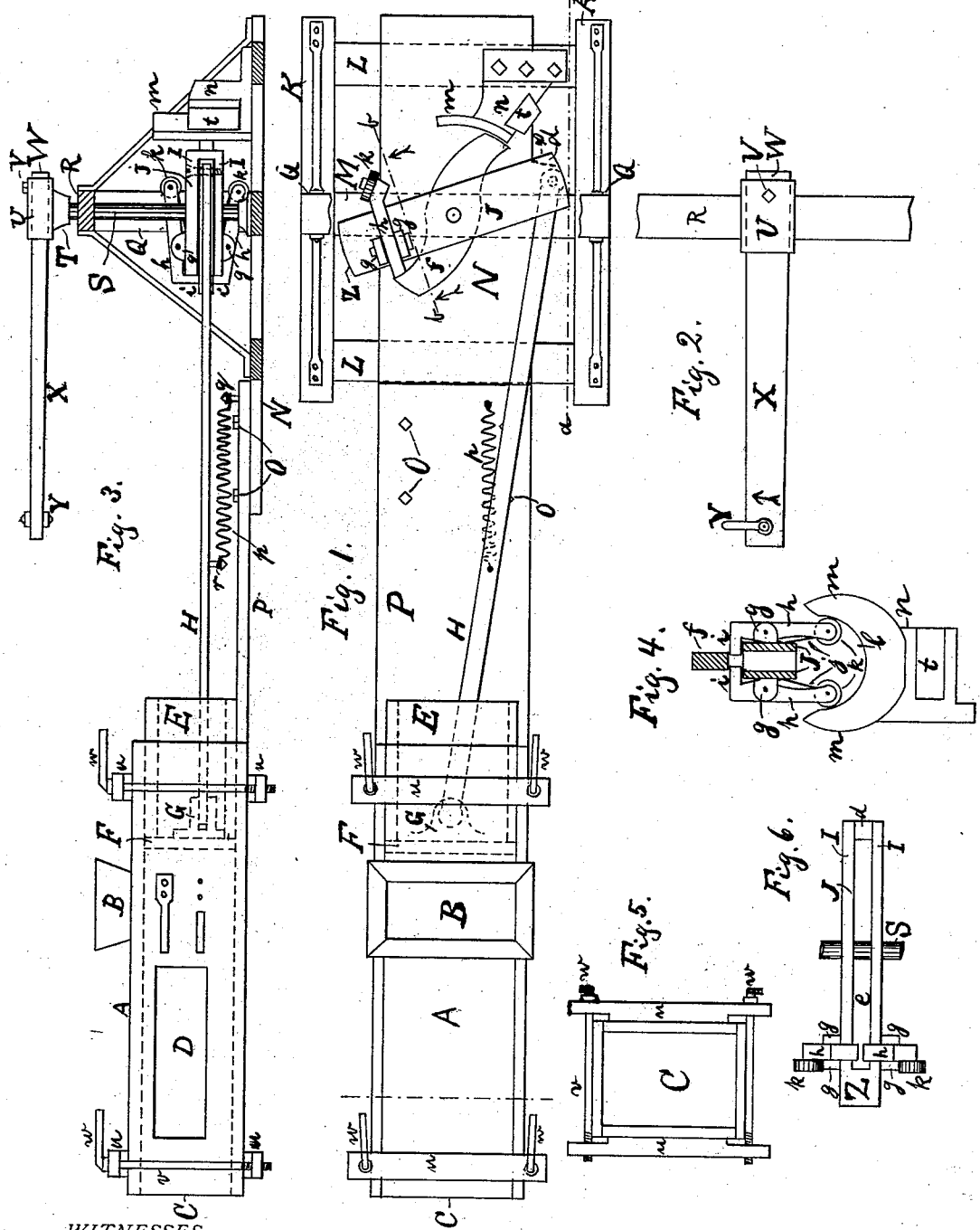

PEDER NELSEN, OF ST. PAUL, MINNESOTA, ASSIGNOR OF TWO-THIRDS TO PATRICK J. KEOUGH, OF SAME PLACE.

BALING-PRESS.

SPECIFICATION forming part of Letters Patent No. 508,966, dated November 21, 1893.

Application filed November 25, 1892. Serial No. 452,996. (No model.)

*To all whom it may concern:*

Be it known that I, PEDER NELSEN, a subject of the King of Denmark, residing at St. Paul, in the county of Ramsey and State of Minnesota, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in baling presses for baling hay, straw, excelsior, &c., and is of the class in which a horizontal trunk or bale chamber opens at the delivery end, is provided in its opposite end with an internal reciprocating plunger by which the successive charges of hay fed down through an opening in the top side of the trunk, are advanced against those which preceded them, and thus a body or mass accumulated and gradually moved through and discharged from the end of the baling chamber.

The object of my invention is to provide a baling press that has none of the undue strains on any of its parts, by which baling presses usually are so apt to get broken or out of order. I attain this object by the construction and arrangement of parts illustrated in the accompanying drawings, in which—

Figure 1, is a plan view of my press with the sweep and top plank of the horse power removed. Fig. 2, is the said portion removed from Fig. 1. Fig. 3, is a side elevation of the press with the horse-power shown in section on the line *a, a,* in Fig. 1. Fig. 4, is a partly sectional detail view of the trip mechanism of the machine, on the line *b, b,* in Fig. 1, but shown as in contact with the tripping bracket. Fig. 5, is an end view of the baling chamber. Fig. 6, is a detail view of a portion of the horse-power.

Referring to the drawings by letters of reference, A, is the baling chamber; B, the hopper through which the hay is fed down.

C, is the end of the bale chamber at which the bales are discharged.

D, is an opening provided in each side of the bale chamber for admitting the bales to be tied before leaving the press.

E, is the plunger which I prefer to make open inside with a heavy front plate F, to the rear side of which I secure a bracket G, in which the one end of a pitman H, is pivoted. The opposite end of said pitman H, is pivoted between the lips I, of the oscillating yoke J, of the horse-power, which consists of the timbers K, L, M, and a plank N, which is detachably secured by the bolts O, to the plank P, which forms the bottom of the baling chamber and extends beyond the latter so as to be bolted to the plank N, of the horse-power when the press is set up for use; while for transportation the bolts O, may be removed and the press knocked down. From the timbers K, extend upwardly the uprights Q, (best shown in Fig. 3,) upon the tops of which I secure the cross plank R. In said timbers R, and M, I journal in suitable metallic bearings the upright shaft S, to the upper end of which I secure a casting T, provided with a socket U, into which I insert and secure by a screw V, the end W, of the sweep X, which is provided near its free end with a clevis Y, to which the horses are hitched in operating the press.

Upon the revoluble shaft S, I journal the oscillating yoke J, which, as shown in Fig. 6, consists of two parallel bars I, I, cast together at both ends forming at one end a chunky piece of metal as Z, for helping to counterbalance the pitman H, resting in the opposite end of the yoke; at the other end of the yoke the bars I, are secured together by a small triangular stem *d*, cast or secured between them. In the space *e*, formed between the bars I, of the yoke J, I secure rigidly upon the shaft S, a somewhat S-shaped double arm beam *f*, which rotates with the shaft S, and sweep X. Near the end Z, the yoke J, is provided at its top and bottom sides with a pair of lugs *g*, between which I pivot the two L-shaped trip levers *h;* the front ends *i*, of which are by means of the spring *j*, closed toward each other to prevent the ends of the beam *f*, from passing through the slot *e*, of the yoke. The opposite ends of the trip levers *h*, are provided with anti-friction rollers *k*. When these rollers are brought into contact with the inner curved edges or surfaces $l$, of the arms $m$, of the bifurcated bracket $n$, secured upon the timber L, the rollers and the lever ends upon which they are pivoted, are by the curved surfaces $l$, swung toward each other which causes the opposite lever ends $i$, to part and let the end of the beam $f$, pass between them after it has pressed against them long enough to cause the yoke J, to turn about one hundred and twenty degrees and cause the pitman H, to assume a position about parallel with the plank P, so that the plunger E, is on its extreme point toward the delivery end of the press. Every time that one of the ends of the beam $f$, is thus tripped from the lever ends $i$, the coil spring $p$, secured with one end to the peg $q$, in the plank P, and the other end at the peg $r$, in the pitman H, causes the latter to return to its normal position, bringing the plunger back out of the way for a new charge of hay to fall down the funnel B, and the end $s$, of the yoke J, stops against the rubber bumper $t$, which is dove-tailed into the bracket $n$. As soon as the yoke J, swings back to said position the rollers $k$, being thereby released from the grasp of the bracket arms $m$, spread and make the lever ends $i$, close so as to give the next end of the beam $f$, a chance to operate the yoke and give another push to the plunger, and so on.

$u$, $u$, are cross-bars adjustable toward each other by long screws $v$, having handles $w$, for turning them by and being screw-threaded with their ends in the bar $u$, underneath the baling chamber. These bars $u$, and screws $v$, are used at the delivery end of the baling chamber for adjusting the top and bottom planks of the baling chamber slightly toward each other, so as to cause more friction to the bale of hay being pressed in the chamber. Similar bars and screws are used at the end of the baling chamber in which the plunger works, for taking up the wear and tear of the latter.

From the above description it will be seen that I provide a very compact, strong and substantial baling press with the special feature of strength resulting from the use of two trip levers by which all upward or downward pressure upon the yoke J, and beam $f$, tending to break or wear them loose is dispensed with, as the considerable pressure necessary to trip the press is divided upon opposite sides of the yoke. Another weak point in hay presses is the cushion that receives the rebounding blow of the oscillating and reciprocating parts. The cushion or bumper is usually so placed that it will, after a short time of wear, tear off from its nail, bolt or the like fastening, or escape from its parallel socket. This difficulty I have overcome by the use of a very substantial metallic bracket having a dove-tailed indenture into which the rubber bumper is driven tightly.

I am aware that prior to my invention baling presses have been invented with baling chambers, feed hoppers, plungers, adjustment clamps and sweeps similar to those I use, so I do not claim those items broadly, but What I do claim, and desire to secure by Letters Patent, is—

1. In a baling press and in combination with a suitable supporting frame and baling chamber, the reciprocating plunger E, having the internal bracket G, pitman H, pivoted therein, the retracting spring $p$, secured to the pitman and to the frame of the press near the horse power, the oscillating yoke J, operating said pitman, and having the slot $e$, the S-shaped beam $f$, revolving in said slot, the trip levers $h$, pivoted at opposite sides of the yoke, and having vertically bent ends as $i$, for engaging the ends of the beam and suitable means for tripping said levers, substantially as shown and described.

2. The combination of the rotating sweep X, socket U, shaft S, and double arm beam $f$, of the slotted yoke J, having the lugs $g$, provided at its upper and lower sides, the L-shaped springheld trip levers $h$, $i$, pivoted between said lugs and having anti-friction rollers engaging with the inner curved surface of a bifurcated bracket, as $n$, adapted to close the ends of the levers provided with rollers toward each other, thereby causing the L-shaped ends to part and release the beam, said bracket $n$, having a dove-tailed groove in which a rubber bumper or cushion as $t$, is secured, substantially as and for the purpose specified.

In testimony whereof I affix my signature in presence of two witnesses.

PEDER NELSEN.

Witnesses:
THOS. P. BRENNAN,
A. M. CARLSEN.